(No Model.) 2 Sheets—Sheet 1.

I. B. DAVIS.
MACHINE FOR FLANGING BOILER HEADS.

No. 409,021. Patented Aug. 13, 1889.

Witnesses:
H. R. Williams.
A. B. Jenkins.

Inventor,
Isaac B. Davis,
by Simonds & Burdett,
attorneys.

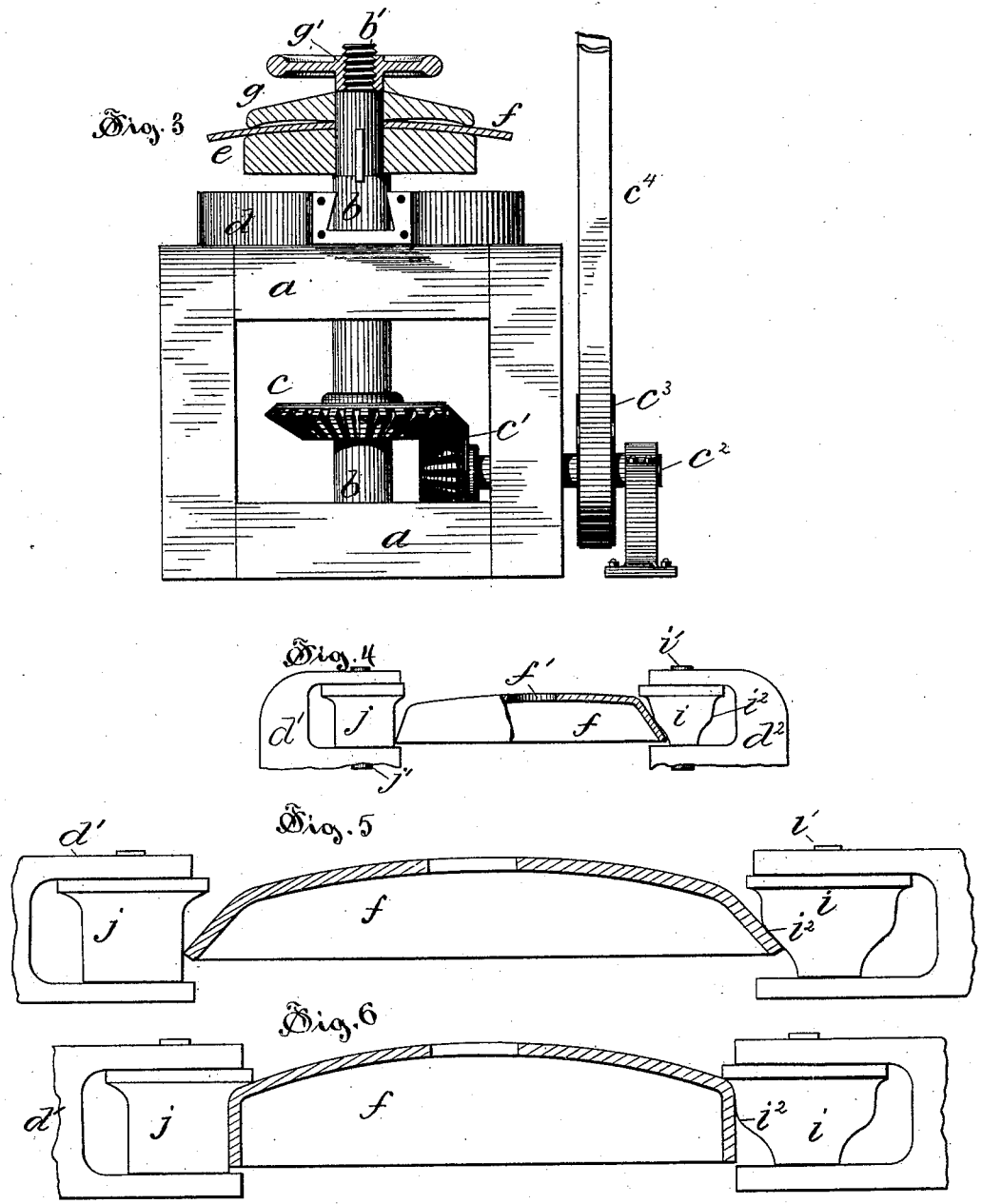

UNITED STATES PATENT OFFICE.

ISAAC B. DAVIS, OF HARTFORD, CONNECTICUT.

MACHINE FOR FLANGING BOILER-HEADS.

SPECIFICATION forming part of Letters Patent No. 409,021, dated August 13, 1889.

Application filed January 6, 1888. Serial No. 259,985. (No model.)

*To all whom it may concern:*

Be it known that I, ISAAC B. DAVIS, of Hartford, in the county of Hartford and State of Connecticut, have invented certain new and useful Improvements in Machines for Making Boiler-Heads, of which the following is a full, clear, and exact description, whereby any one skilled in the art can make and use the same.

The object of my improvement is to provide a machine of comparatively simple and cheap construction by the operation of which boiler-heads may be suitably formed for uniting to the shell; and to this end my improvement consists in the combination of the several devices composing the machine, as more particularly hereinafter described, and pointed out in the claims.

Figure 1:
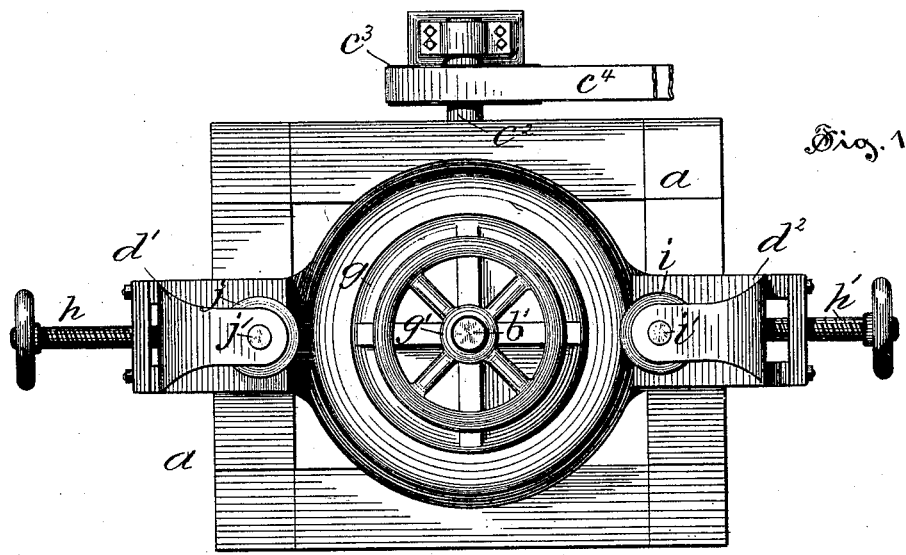
Figure 2:
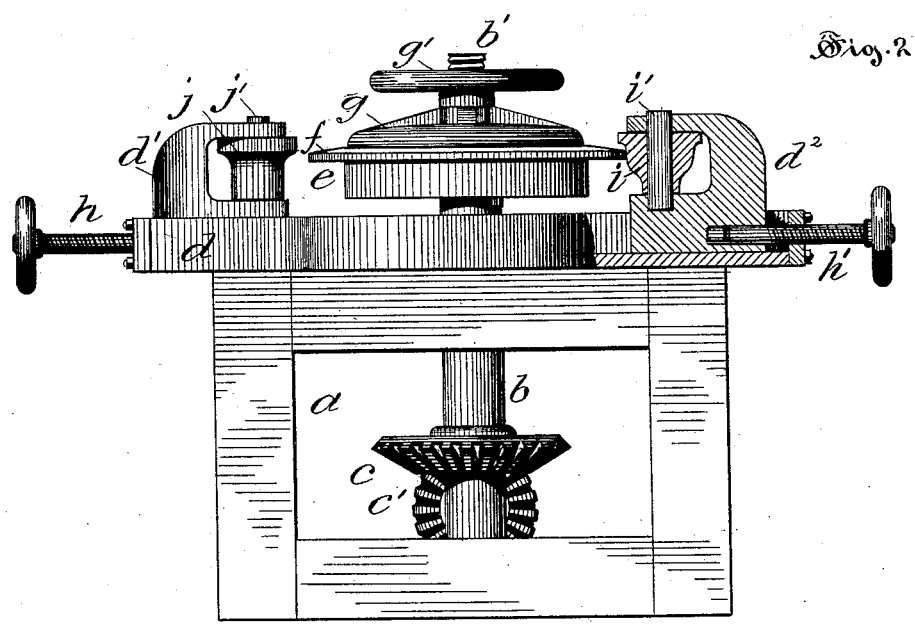

Referring to the drawings, Figure 1 is a plan view of a machine embodying my improvements. Fig. 2 is a view of the same machine in front elevation. Fig. 3 is an end view of the machine, showing a part cut in central section to show the construction. Figs. 4, 5, and 6 are views illustrating the method of breaking down the edge and finishing the head.

In the accompanying drawings, the letter $a$ denotes the frame of my improved machine, the said frame being made of any convenient material and adapted to support in a vertical position (in the form shown) the shaft $b$, that bears the bevel-gear $c$. This shaft $b$ projects beyond the frame-work through the bed-plate $d$ and terminates in a threaded end $b'$. A former $e$ is splined or otherwise fastened to the shaft $b$, and it has a face and edge corresponding in outline to the shape to be given to the boiler-head $f$. This boiler-head $f$ has a central opening $f'$, which permits it to be slipped upon the outer end of the shaft $b$, and the clamp-plate $g$ is then placed upon the shaft, and by means of the nut $g'$, that in this instance is formed in the hub of a hand-wheel, the clamping-plate may be forced down upon the plate so as to securely hold the plate between the former $e$ and the clamp-plate $g$. The edge of the plate projects a certain distance beyond the edge of the former, as shown in Figs. 2 and 3 of the drawings.

Upon diametrically-opposite sides of the bed-plate $d$ are formed slideways with the edges undercut, so that the dovetailed tenons on the carriages $d'$ $d^2$ will be held against anything but lengthwise movement in the ways. Each of these carriages is connected to the bed by means of a feed-screw $h$ $h'$, one end of which is secured to the carriage in a manner that will permit the screw to rotate while the threaded shaft of the screw passes through a nut secured to the bed, the result of this construction being that each carriage may be fed toward and from the central shaft when desired. The shaft $b$ of this machine is driven by means of the gear $c'$, that intermeshes with the gear $c$, the former gear being secured on the inner end of a shaft $c^2$, that is supported in suitable bearings, and is provided with a pulley $c^3$, driven by means of the belt $c^4$ from a counter-shaft or any other suitable source of power.

The carriage $d^2$ bears a forming-roll $i$, that is pivotally supported in the carriage on the pivot-pin $i'$, placed in a line substantially parallel to the axis of the shaft $b$. The general shape of this roll is conical, having a rounded or annular projection $i^2$ about midway between its ends, its surface resembling in section an ogee curve, the smaller end of the roll being turned toward the bed-plate. The carriage $d'$ bears another forming-roll $j$, held in place by the pivot-pin $j'$, on which it turns, and the face of this latter roll $j$ is for the greater part of its length cylindrical and parallel to the axis of the shaft $b$, the cylindrical portion curving outward where it meets the larger upper end of the roll, the smaller end of this roll being also turned toward the bed-plate. After a blank of a boiler-head $f$ has been heated to the required temperature and secured to the central shaft $b$, as described, the shaft is driven at any desired rate of speed. About sixty turns to the minute has been found effective in practice. The roll $j$ is fed inward against the projecting edge of the plate, which is by the rotation of the roll bent slightly downward, and the other forming-roll $i$ is then fed in against the edge of the plate, catching it with the projecting part $i^2$ of the roll and bending the plate still farther downward as this roll is fed inward. While the heated plate is revolving these two forming-rolls $i$ and $j$ are fed inward against the edge of the plate. The peculiar projection $i^2$ on the roll $i$ tends to draw the plate downward toward the former, as shown in Fig. 5, at the same time that the edge is bent inward, while the other roll $j$, working upon the diametrically-opposite sides of the plate, tends to press the plate inward, the operation of the two rolls at the same time upon opposite sides of the plate aiding in finishing the downturned edge in a cylindrical form true to gage in outside measurement. The clamp-plate $g$ is of disk shape, hollowed underneath, and with its edge biting sharply upon the heated blank near the outer edge of the former with the result that a firmer grasp is given upon the plate to hold it against sliding movement on the former $e$. The heated blank $f$ is also held against any lateral movement by the prolongation of the shaft $b$, that extends through it, as shown in Fig. 3.

I claim as my invention—

1. In a machine for forming boiler-heads, the combination, with a rotary shaft, a form attached thereto, and a clamp for securing a blank to one face of the form, of laterally-adjustable rolls arranged to rotate in the same plane as the form, one of said rolls being constructed with an annular projection and the other roll constructed with an overhanging edge, substantially as set forth.

2. In a machine for forming boiler-heads, the combination, with a rotary shaft, a form attached thereto, and a clamping device for securing a blank to one side of the form, of two laterally-adjustable rolls located on opposite sides of the form and arranged to rotate in the same plane therewith, one of said rolls being cylindrical and provided with an overhanging edge and the other roll made tapering and provided with an irregular-curved surface, substantially as set forth.

3. In combination with a rotary shaft bearing a form and a clamp device, whereby a disk-shaped boiler-head blank is held between the form and the clamping-disk, the base bearing the reciprocating carriages, the reciprocating carriages arranged on diametrically-opposite sides of the shaft and form the carriage-feeding devices, and the forming-rolls borne in said carriages, one of the said rolls being conical and having an annular curved projection and the other and opposite roll having the cylindrical working-surface placed parallel to the plane of the annular rim of the form, and having the curved edge overhanging the cylindrical body of the roll, all substantially as described.

ISAAC B. DAVIS.

Witnesses:
CHAS. L. BURDETT,
A. B. JENKINS.